United States Patent [19]

Carlsen

[11] 4,316,344

[45] Feb. 23, 1982

[54] ROACH TRAP

[76] Inventor: Carl E. Carlsen, Rutledge Hotel/161 Lex. Ave., New York, N.Y. 10016

[21] Appl. No.: 218,718

[22] Filed: Dec. 22, 1980

[51] Int. Cl.³ .............................................. A01M 1/14
[52] U.S. Cl. .......................................... 43/114; 43/121
[58] Field of Search .......................... 43/114, 121, 122

[56] References Cited

U.S. PATENT DOCUMENTS

| | | | |
|---|---|---|---|
| 501,350 | 7/1893 | Kuntz | 43/121 |
| 1,623,439 | 4/1927 | Rawlings | 43/121 |
| 1,867,252 | 7/1932 | Crigler | 43/121 |
| 3,341,967 | 9/1967 | Kelley | 43/121 X |
| 3,908,302 | 9/1975 | Carr | 43/121 X |
| 3,940,874 | 3/1976 | Katsuda | 43/114 |
| 4,030,233 | 6/1977 | Wunsche | 43/121 |
| 4,044,495 | 8/1977 | Nishimura | 43/121 |
| 4,048,747 | 9/1977 | Shanahan | 43/114 |
| 4,208,828 | 10/1980 | Hall et al. | 43/114 |

*Primary Examiner*—Nicholas P. Godici

[57] ABSTRACT

A roach trap enclosed vessel that has a lower transparent wall to a lower compartment thereof and an upper non-transparent wall to the lower compartment, and has a lower compartment entry port from the upper compartment into the lower compartment and an upper entry port through an upper wall or roof of the enclosed vessel. The roach trap has the lower entry port's lower conical end spaced-above an interior surface or floor of the lower compartment sufficiently to prevent a roach from reaching upwardly to gain escape access thereto, and has a strip of adhesive circumscribing an interior wall within the enclosed vessel barring exit between the lower compartment and the upper entry port. The lower conical entry port is aligned beneath the upper entry port that is also downwardly conically shaped.

2 Claims, 7 Drawing Figures

ROACH TRAP

This invention is directed to an improved roach trap.

BACKGROUND OF THE INVENTION

Prior to the present invention, exit of roaches from interior spaces within a roach trap have been barred typically solely by reliance upon space between typically an overhanging port and point as spaced-above a surface with the capture space, with the space therebetween being too great for the roach to reach upwardly to gain exit through the entry port. Typical prior art is exemplified by patents such as U.S. Pat. No. 3,908,302 of Richard V. Carr, U.S. Pat. No. 4,208,828 of H. Hedley Hall, and U.S. Pat. No. 4,044,495 of Akira Nishimura et al.. Another type roach trap constituting a part of the prior art has been one in which a sticky adhesive substance was utilized along a surface in order to adhere to a roach attempting to pass thereover and thereby trap the roach by anchoring the roach when it touches the sticky surface. Such patent is illustrated by U.S. Pat. No. 3,940,874 of Yoshio Katsuda.

In roach traps of the designs of the types noted above, there are inherent disadvantages and difficulties which result from the very nature of the conduct of roaches. For example, in the traps such as of the U.S. Pat. Nos. 3,908,302 and 4,208,828 and 4,044,495, it is possible for roaches to climb onto surfaces and along surfaces that are comparable to a wall of inwardly-slanted upright wall or even horizontal ceiling-like wall, allowing the roach to cling by its feet to such surfaces and to reach and exit through the entry ports of such patents. While not all roaches would normally escape, a significantly large number do escape these types of traps. The roach trap of U.S. Pat. No. 3,940,874 uses an adhesive material that is supposed to capture the roach when the roach purportedly walks thereacross to reach the food material. As a matter of fact, as a part of the present invention it has been discovered that the roaches will not cross or attempt to cross such stick material. Accordingly, while it is possible and probable that some roaches might venture sufficiently close and accidently upon a tacky surface as to become trapped thereon, such would be the exception rather than the rule.

BROAD DESCRIPTION

Accordingly, objects of the present invention are to overcome problems and disadvantages of prior roach traps, and to obtain improved roach trap structures with novel advantages not heretofore available.

Another object is to obtain a novel roach trap which will inherently encourage other roaches to inter the trap.

Another object is to obtain a roach trap which by its structured nature is easy to keep clean and to empty and to be reused repeatedly.

Another object is to obtain an improved roach trap in which escape of roaches therefrom is substantially impossible or totally eliminated.

Another object is to obtain a roach trap of improved structure and design, simple in parts and structure.

Another object is obtain a roach trap that may be manufactured and sold at low costs.

Other objects become apparent from the preceding and following disclosure.

One or more objects of the invention are obtained by the invention as disclosed herein, as typically illustrated in the accompanying drawings which are not intended to unduly limit the invention but are alternatively for improving understanding of operation of the invention and for illustrating preferred embodiments and features thereof.

Broadly the invention may be described as a roach trap in the form of an enclosed vessel having an entry port large enough for a roach to pass therethrough with the entry port positioned sufficiently above an interior floor-like surface as to prevent a roach from escaping by reaching upwardly to grasp edges of structure of the entry port, the major improvement of the overall combination being the employment of an adhesive tacky coating located on a surface positioned at a location between the entry port and other interior space and interior surfaces. Accordingly, the essence of the invention in its broadest aspect is to utilize tacky adhesive as a bar or barrier against access to the exit port from other trap space of the enclosed vessel. The adhesive tacky coating is located normally within the vessel or within the structure of the entry port, at least, at a location that does not interfere with nor constitute a barrier to entry or travel to entry for entering the trap, but does does constitute a barrier between capture space and surfaces and exit space of the exit port(s).

Due to the discovery also that roaches tend to congregate in the nature of a nest, where other roaches are found in large numbers or are seen or detected as moving around among each other, the present invention accordingly includes as apart of the enclosing vessel preferably at least one or more or a portion of lower side walls of the roach trap being substantially transparent. By transparent, it is meant totally transparent or merely translucent, is use of the term substantially transparent, for any one or more lower wall(s) or portions thereof, and possibly also of other upper walls, top, etc.; but desirably the upper portion remains darkened within, such that roaches tend to be content to remain within the darkened areas and not attempt escape, and to travel toward the lower lighted areas if escape is attempted, thus by so doing the roaches moving away from the exit area, thus being more escape-proof. Also, thereby the roaches exterior to the trap are enticed by roaches within the trap as detected through the transparent wall(s), to themselves also enter the trap, by climbing upon the trap outer walls toward and into the entry port where they fall through into the trap space within the enclosed vessel.

More preferably, the adhesive tacky surface or coating is located in the vicinity of the entry port, although not necessarily immediately adjacent thereto, but at least at one or more positions as to act as barrier(s) to escape as between the main trap space and surfaces adjacent to and leading from the entrance ports(s): such that roaches would have to travel upon and across the adhesive tacky surface in order to gain access to exterior space in an escape route. This adhesive tacky coating, accordingly, is typically positioned in a substantially or totally annular or at least circumscribing continuous strip or arrangement around or near all portions of the entry port. Thereby, the roaches are prevented from crawling along surfaces to reach entry space of the entry port and thereby are barred from access to escape through the entry port. It is to be understood, as preveiously mentioned, it is the fact of the presence of the adhesive tacky coating as a barrier in the path of possible escape, and the fact that it has been now determined that roaches do not normally randomly and freely tend to walk on adhesive tacky coatings and will avoid walking on such surfaces even though the result is to remain trapped.

In another preferred embodiment, there is not merely a single circumscribing arrangement or strip of adhesive tacky coating, but there are a plurality of such strips of adhesive tacky coating arranged in series with one another, arranged along and across a path of escape as between the entrapment space and the surface structures making up the entry port.

Accordingly, each of the plurality of adhesive tacky coating strips would be arranged in consecutive circumscribing strips around the entry port so as to repeatedly deter or bar roaches against reaching exterior space and escaping through the entry port(s).

In a further preferred embodiment, the entry port structure is in the form of a narrowing cone, narrowing toward the inner portion of the enclosed vessel and extending into the enclosed space of the enclosed vessel. Accordingly, as a roach travels onto exterior portions of the roach trap, and guided into the narrowing inner portions of the cone, the roach(es) drop(s) typically downwardly from the conical spout downwardly through space onto the surface therebelow, either as a result of trying to reach the food material located within the interior space, or as a result of trying to reach other roaches within the space, or as a result of being pushed by other roaches also attempting to move around at the mouth of the spout of the narrowed cone.

As a further improvement, the invention includes a plurality of cones positioned substantially coaxially one to another in order that they drop from one cone through the other or toward the other, and from there inwardly into the main capture space. Likewise, in the event that one or more roaches were able to get across one or more adhesive barriers and/or to gain access to an inner-most one of consecutive exit port cones in series, there still would be a further cone barrier and preferably also a further adhesive tacky surface or circuscribing strip preventing or detering the roaches from climbing continuingly upwardly and onto the inner surface of the outer-most cone, thereby constituting further barrier(s) against escape by the roaches through the entry port of the outer-most cone, the roaches often being susceptable to falling again into the main capture space within the enclosed space.

Thus, as above-noted, adhesive tacky coating as a strip, for example, may be located on surface(s) between two consecutive cones, in the path of escape of roaches, but position so as to not deter entry by the roaches.

THE FIGURES

FIGS. 1 through 3 represent one embodiment of the invention, while FIGS. 4 through 7 represent another embodiment.

In particular, FIG. 1 illustrates a side cross-sectional view of a first preferred embodiment.

DETAILED DESCRIPTION

In greater detail, it will be noted that the illustrated two preferred embodiments are composed of basically similar elements, and for substantially common elements, similar identity numerals are utilized, and description will not be always repeated for the naming of common or like elements.

Figure 1:
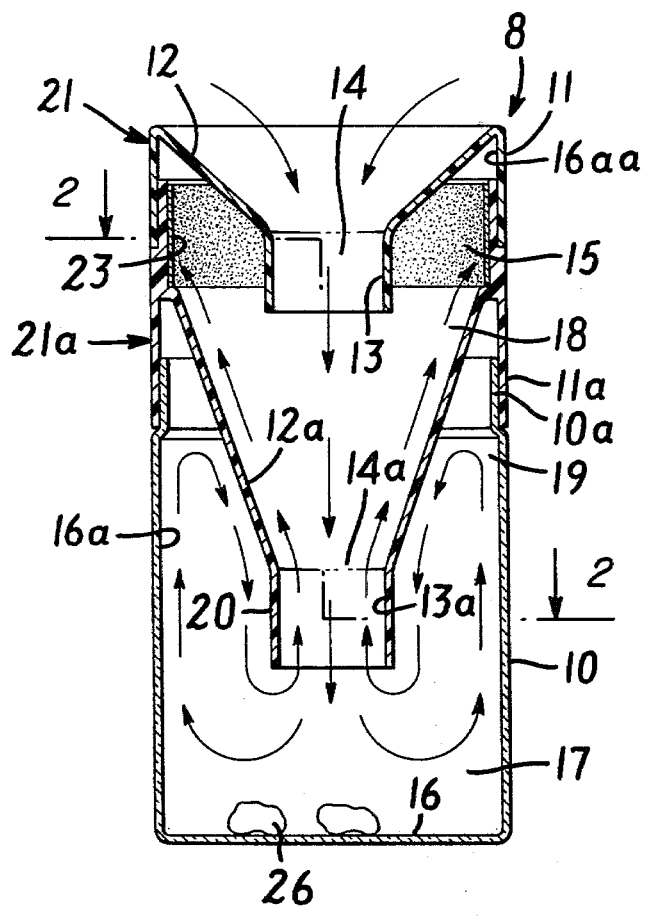
Figure 3:
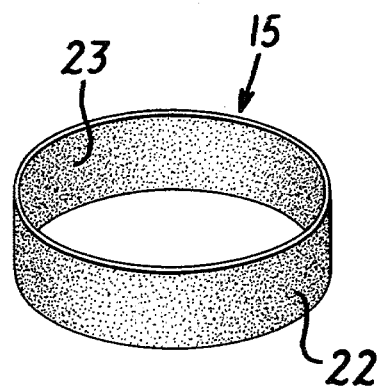
FIG. 3 represents a perspective view of the annular circumscribing strip of FIG. 1, having adhesive inner and outer coatings as sticky material.
Figure 2:
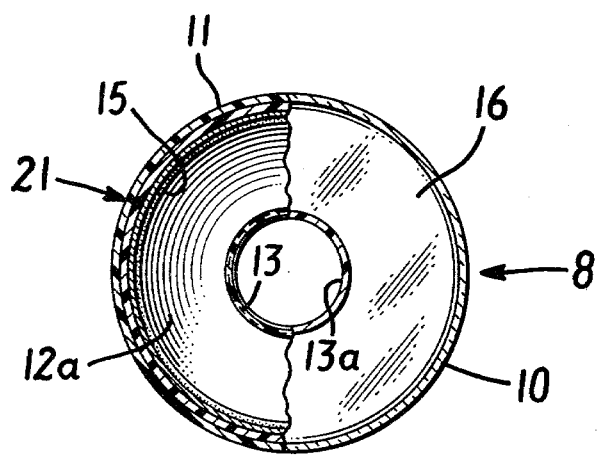
FIG. 2 illustrates a cross-section view of the embodiment of FIG. 1, as taken along line 2—2 of FIG. 1.

There may be seen in FIGS. 1 through 3 the embodiment 8 of the invention. FIG. 1 shows a side cross-sectional view of embodiment 8. There may be seen in FIGS. 4 through 7 the embodiment 9, shown in FIG. 4 in side cross-sectional view.

The respective FIGS. 1, 2, and 3 illustrate the following elements. The transparent jar or other container 10 forms the primary capture and retaining space of this embodiment, having retaining or capture space 17 therein. There is a top entry-port structure 21 having the female-fitting exterior wall 11 of circumscribing or circular shape and having as a top portion thereof the downwardly-slanting funnel surface 12 ending in a narrowed funnel spout 15 defining the entry port space 14. Also shown in FIG. 1 is a second concentrically mounted funnel structure and lid structure jointly identified as 21a, having the female-mating top-structure 11a for mounting on the male-type jar top 10a and having the second-occuring conical cone structure surface 12a ending in the end spout 13a forming the second conical space 14a. Mounted within the upper space 18 on an inner surface of the cone structure surface 12a, is the adhesive tacky coating strip 15 having the interior or exposed adhesive tacky coating as a part thereof identified as coating 23 overwhich the travel of roaches is deterred or prevented by virtue of the tacky nature thereof. While roaches may collect within the jar space 19 up near the upper portions of the cone 20, typically roaches attempting to go around the spout downwardly will fall down into the space 17 onto the surface 16, not normally making it around the end of the downwardly-extending spout. Those making around the end of the spout 13a find the adhesive tacky coating surface or strip 15 with its barrier surface of tacky adhesive coating 23, thus preventing such roaches from reaching the spout 13. Those few that might sometime reach spout 13 in an escape travel, again face the task of climbing under such spout and more often fall downwardly again through space 14a into space 17; this is particularly true since a roach having reached this point would be somewhat drained of energy over the period of time required, and over a period of time devoid of nurishment, recognizing that within the present traps and sub-traps between consecutive cone portions, the trapped roaches will tend to congregate or simply lay idle at least for extended periods of time. The strip 15 has adhesive tacky matter 23 on the inwardly facing surface thereof. However, as shown in FIG. 3, in a preferred embodiment the sticky or adhesive strip 15 also has tacky adhesive coating 22 on the outer surface, which thereby binds it to the surface or face of the cone 21a. However, the ring 15 may alternatively be pressure-fitted into its mounted position devoid of any coating 22. While the embodiment 9 of FIG. 4 differs in its structure somewhat, it is basically similar to the embodiment 8; accordingly corresponding indicia identify substantially like-elements.

Figure 4:
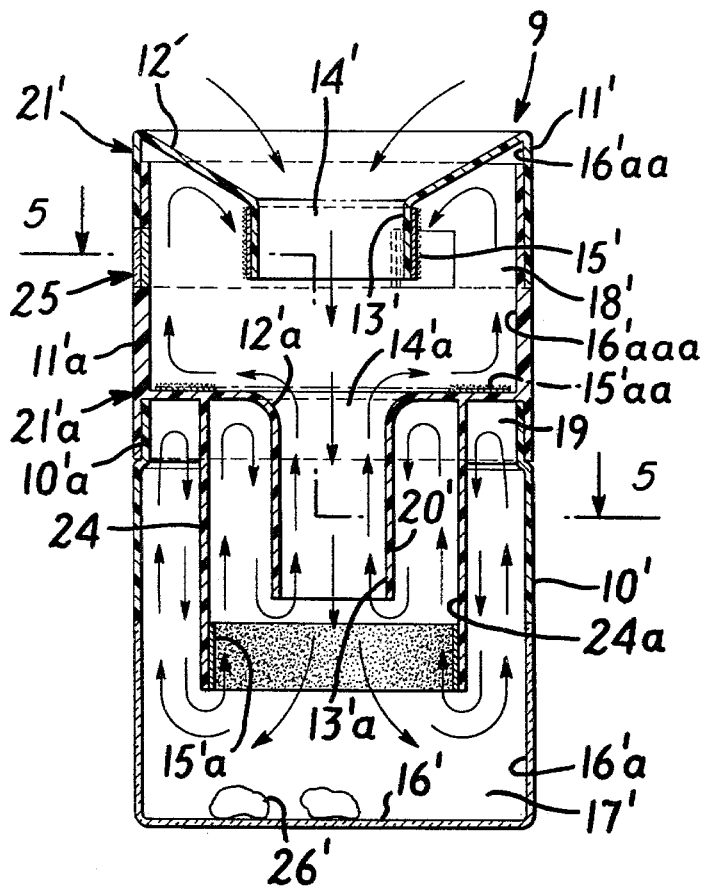
FIG. 4 illustrates a side cross-sectional view of a second embodiment.
Figure 6:
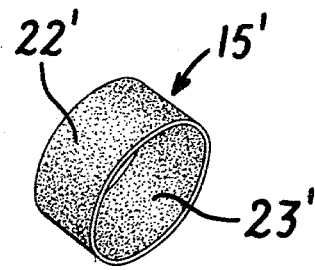
FIG. 6 illustrates a perspective view of the annular circumscribing strip of FIG. 4, having adhesive inner and outer sticky coatings.
Figure 5:
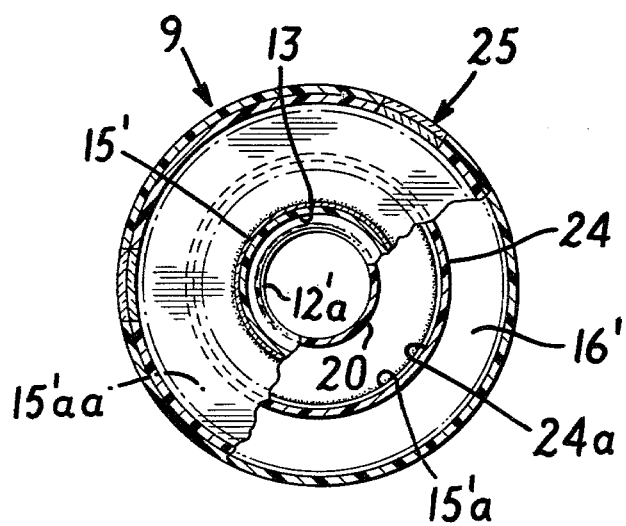
FIG. 5 illustrates a cross-sectional view of the embodiment of FIG. 4, as taken along line 5—5 of FIG. 4.

However, the FIG. 4 embodiment has a transparent window portion for each of the matched structures 21' and 21'a. Additionally it is noted that the adhesvie strip 15' is mounted as a female structure onto a male structure which male structure is the spout 13' and accordingly having the barrier adhesive tacky coating strip 15' with its tacky adhesive coating 22' on the exterior or exposed location as a barrier against roach travel past such strip. In this embodiment, the adhesive coating 23' is optional but is preferred as a means of securing the strip 15' onto the outer face of the spout 13'. As with the embodiment 8, the strip 15' may be pressure-fitted onto the spout 13' in this embodiment 9. Also additional, however, is the presence of the additional adhesive strips 15'aa and 15'a, the strip 15'a being on an interior face of the downwardly-extending barrier between the spout 13'a and the various capture space surfaces 16', 16'a and 24. Accordingly, while roaches may travel on the travel surfaces 16', 16'a, and 24, they are unlikely to travel over the adhesive strip 15'a even if they are otherwise able to make it around the bottom portion of wall surface 24, i.e. it being unlikely that the roaches will ever reach the surface 24a. But for those roaches that do reach the surface 24a by some exceptional circumstance, there is still the problem of getting around the bottom of the wall 20 into the spout space of spout 13'a, being more likely to again fall into the space 17' onto the floor-like surface 16'. It should be apparent that the embodiment 9 would be more fool proof against any possible escape of roaches, as compared to the embodiment 8. However, the embodiment 8 is highly effective and it would be a rare situation that a roach would escape past the adhesive tacky coating strip 15 thereof.

In addition to the advantages set forth in prior discussions above, it should be apparent also that by virtue of the cap-like funnel structures and entry-port-forming structures that the vessel 10 or other vessel 10' is adapted to maintaining sanitary conditions by intermittent emptying of the vessel and washing and drying the vessel, and thereafter placing fresh food material 26 or 26' therein.

Figure 7:
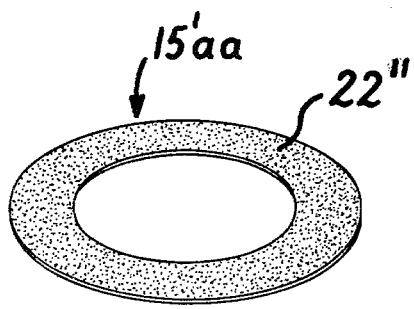
FIG. 7 illustrates a perspective view of another disc-like annular adhesive tacky coating-ring of the FIG. 4 embodiment.

With reference to FIG. 7, it may be seen that as represented in this particular embodiment 9, the strip 15'aa is disc-shaped having adhesive tacky coating 22" on an upper surface thereof. As in other situation, there may optionally also be adhesive on the bottom face thereof to attach to mounting surfaces to prevent any possibility of roaches from going beneath the strip disc.

It is within the scope of the invention to make such variations and modifications and substitution of equivalents as would be apparent to an artisan of ordinary skill in this particular art.

I claim:

1. A roach trap comprising in combination: an enclosed vessel having separate upper and lower compartments in series and in communication with one-another and the upper compartment having an upper entry port opening from exterior space to the upper compartment, and the lower compartment having a lower entry port connecting the upper and lower compartments and being above an interior lower floor-like surface at a sufficient height to avoid a roach reaching upwardly and gaining exit by the lower entry port, a lower side wall of the lower compartment being substantially transparent and an upper side wall of the lower compartment being non-transparent whereby upper space of the lower compartmet remains darkened, and a strip of adhesive tacky coating within the enclosed vessel exterior to enclosed space of the lower compartment and substantially circumscribing a surface between space of the lower compartment and space within said upper entry port such that exit to said upper entry port is barred by said strip.

2. A roach trap of claim 1, in which said upper and lower entry ports are each substantially conical narrowing downwardly, arranged with the lower entry port aligned substantially beneath the upper entry port substantially coaxially.

* * * * *